May 31, 1960 R. J. BROADWELL 2,938,719
DAMPED VALVE DEVICE
Filed March 18, 1957 2 Sheets-Sheet 1

INVENTOR.
ROBERT J. BROADWELL
BY Hudson, Boughton,
Williams, David & Hoffmann
ATTORNEYS

INVENTOR.
ROBERT J. BROADWELL
ATTORNEYS

United States Patent Office 2,938,719
Patented May 31, 1960

2,938,719
DAMPED VALVE DEVICE

Robert J. Broadwell, Cleveland, Ohio, assignor to The Gabriel Company, Cleveland, Ohio, a corporation of Ohio Filed Mar. 18, 1957, Ser. No. 646,717

6 Claims. (Cl. 267—65)

This invention relates to a novel damped valve device for controlling the movement of one member relative to another member, wherein either and/or both of said members may be movable, and is particularly applicable for use with a fluid pressure device which effects the relative movement of two movable members, wherein the relative movement of said members actuates the damped valve device to positively control the functioning of said fluid pressure device.

More specifically, primary utility for the instant damped valve device is realized in its use in a pneumatic suspension system for automotive vehicles or the like whereby the body of the vehicle defining one movable member or mass is resiliently supported above the axles thereof by an air spring, said axles defining a second movable member or mass, and wherein said damped valve device is operatively connected between said vehicle members and, further, is actuated by a relative movement therebetween to cause an adjustment to said air spring to maintain said vehicle members in a predetermined spaced relationship.

In the following detailed disclosure of several forms of the present invention said damped valve device is shown and described for use in conjunction with the above type of vehicle pneumatic suspension system; however, it is to be understood that the instant device may be applicable to other systems wherein control of the relative movement between several members may be desired.

Therefore, a primary object of the present invention is the provision of an improved damped valve control device for use with a pressure fluid unit for controlling the relative movement of two movable members.

Another object is the provision of an improved damped valve device as characterized by the preceding object and wherein said device includes a shaft operatively connected to one member and which carries a cam member normally positioned in an inactive position and which is movable by the oscillation of the shaft to selectively control the functioning of said fluid pressure device and thereby control the relative movement of said members in proportion to the movement of said one member connected to the shaft.

Another object of the present invention is the provision of a damped valve device as characterized in the preceding objects and wherein said device is provided with valve means for connecting the pressure fluid unit to a source of fluid pressure or atmosphere which means is selectively actuated by the movement of the cam member carried on the oscillatable shaft in response to a predetermined direction of relative movement between the movable members.

Still another object of the present invention is the provision of an improved damped valve device as characterized in the last two preceding objects and wherein the shaft is resiliently coupled to one movable member and actuated thereby to selectively control the functioning of said fluid pressure device and thereby control the relative movement of said members, and wherein the damped valve device is additionally provided with damping and delay means operative to delay the movement of the shaft.

A further object is the provision of a damped valve device as characterized in the last object and wherein the damping and delay means includes a piston movably disposed in a pressure cylinder and operatively engaging the shaft to delay oscillatable movement of the latter.

The invention may be briefly summarized as consisting in certain constructions and combinations and arrangements of parts, and further objects and advantages will be apparent from the following description of several preferred forms of the invention, reference being made to the accompanying drawings which form a part of this specification and wherein.

Figure 1:
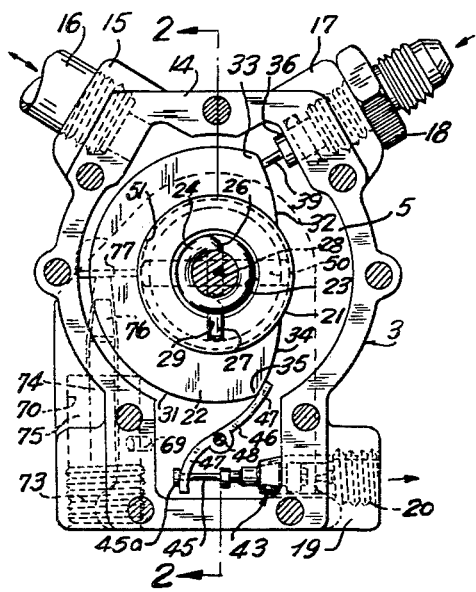
Fig. 1 is an end view taken substantially on line 1—1 of Fig. 2 and shows one form of device embodying the present invention but with the end cap removed from the housing to show a portion of the internal structure.
Figure 2:
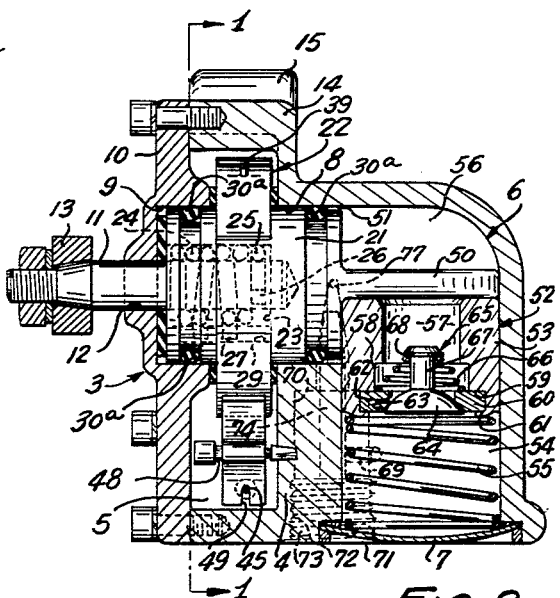
Fig. 2 is a longitudinal sectional view taken on line 2—2 of Fig. 1.

In the following detailed description, the pneumatic suspension system (not shown) shall be considered as of the type referred to above utilizing "air springs" of known construction, and which supports a vehicle body above its axles, being adjustable by the damped valve device of the present invention to maintain said body above said axles in a predetermined spaced relationship.

Assuming that the vehicle body is supported above the axles in their normal riding relationship, then loading of the body would compress the air springs whereby the said body is lowered toward the axles. To prevent this the relative movement between said vehicle members functions to actuate the instant device to introduce a pressurized fluid, preferably air, to said air springs to return said body to its normal riding position. In like manner, if the mass of the body is lessened, the air springs would tend to cause said body to rise farther above the axles and this is prevented by actuation of the damped valve device through the relative movement of said vehicle members whereby the air springs are connected to the atmosphere and deflated in accordance with the diminishing load whereby the body is maintained at its normal riding height relative to the axles.

Additionally, assuming that the vehicle is traveling over an irregular roadway whereby the vehicle members are rapidly forced slightly toward or away from each other, then the damping and delay mechanism of the instant device of the present invention is operative to prevent rapid inflation and/or deflation of the air springs which would eventually cause said air springs to be completely inoperative.

Referring now to the drawings, the damped valve of the present invention will be described hereinafter merely for purposes of illustration as controlling one air spring in a vehicle fluid suspension system. However, it is to be understood that several or more of said air springs may be utilized and connected in fluid circuit with said control device without departing from the inventive concepts contained herein.

The form of damped valve device shown in Figs. 1–5 inclusive, includes a housing 3 having an internal medial upstanding wall or partition 4 defining on either side thereof a pressure cavity 5 and a separate vertically extending fluid cylinder 6 which is sealed on its lower end by a closure member 7. An aperture 8 is formed centrally through the upper portion of said wall or partition and is in longitudinal alignment with a circular recess 9 formed in the housing cap 10, the purpose for which will be later explained. An oscillatable shaft 11 is journalled in the housing and mounts structure, later to be described, which extends into the pressure cavity 5 and fluid cylinder 6. One end of said shaft protrudes through an opening 12 provided in the housing cap and mounts a rock lever 13. The housing is normally adapted to be attached to one of the vehicle members, whereas the rock lever 13 on the shaft may be connected to the other of said vehicle members. In the following disclosure of several forms of the present invention it will be assumed that the housing is attached to the body of the vehicle in an upright position as is illustrated and the shaft is connected to the riding axles of the vehicle by means of the aforesaid rock lever.

As mentioned previously the damped valve device of the present invention is connected into the fluid suspension system of the vehicle and is effective in response to a relative movement between the vehicle members to cause adjustment to the air spring. For this purpose the upper portion of the housing 3 is provided with an upwardly extending flange 14 defining the upper end of the pressure cavity 5 and which is provided on its one side with an internally threaded port 15 communicating with said cavity and which receives one end of a suitable conduit 16, the other end of which is connected to the air spring of the vehicle suspension system. In like manner, an internally threaded port 17 is provided on the opposite side of the flange 14, communicating with the cavity and is adapted to receive a suitable sleeve fitting 18, which, in turn, is connected to a source of pressure fluid (not shown), preferably pressurized air. Also, a boss 19 formed on the lower portion of the housing 3 is provided with a port 20 which opens to the exterior of said housing and communicates with the pressure cavity 5, through which the latter and the air spring in fluid circuit therewith may be exhausted.

The sleeve fitting 18 and port 20 each mount a valve member, later to be described, which is selectively actuated in response to the movement of the shaft 11, to connect the air spring to the aforesaid source of pressure fluid or to atmosphere, respectively. To accomplish this, the inner end of the shaft 11 extends into the pressure cavity 5 of the housing and mounts a cylindrical barrel member 21 having a cam 22 formed on its periphery. Said barrel member is provided centrally with a bore 23 into which the shaft extends in radially inwardly spaced relationship to the walls thereof, and is resiliently coupled to the latter by means of a pair of helical springs 24 and 25 surrounding the shaft. The ends of each of said springs are bent substantially normal to the axis of the shaft 11 to form key fingers 26 and 27. The outer finger 26 of each spring is inserted into a hole 28 formed radially in the shaft 11 and, in like manner, the inner finger 27 of each spring is inserted into a longitudinally extending slot or keyway 29 formed in the barrel member 21 and opening to the bore 23. Opposite ends of said barrel member are journalled in the aperture 8 and the circular recess 9 and provided with suitable O-rings 30a to prevent transgression of pressure fluid therebetween. The cam 22 includes a substantially semicircular surface 31 connected on one end to an inwardly extending curved surface 32 and defining an apex 33 at the juncture thereof, and connected on its opposite end to a similarly formed and opposed inwardly extending curved surface 34, defining an apex 35 therebetween.

With the above resilient coupling provided between the shaft 11 and barrel member 21 it will be realized that when the shaft is rotated, for instance, clockwise as viewed in Fig. 1, the torsional effect of spring 24 will be increased while that of spring 25 will be decreased. Similarly, when the shaft is rotated in the opposite direction, the reverse to that described will be produced. It is also realized that the resilient coupling enables the shaft 11 and barrel member 21 to be slightly oscillatable relative to each other.

Figure 4:
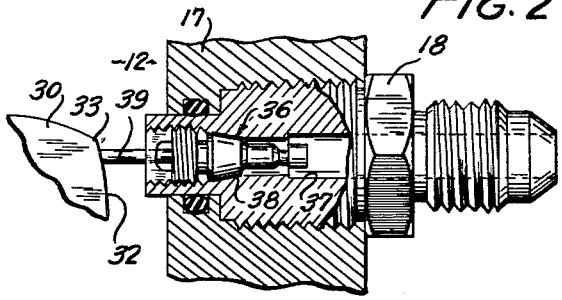
Fig. 4 is an enlarged fragmentary view in section and shows a valve member carried in the housing of Fig. 1 in its normal closed position and which is actuated by the cam member to connect a source of pressurized fluid to the housing pressure cavity and air spring in circuit therewith.
Figure 3:
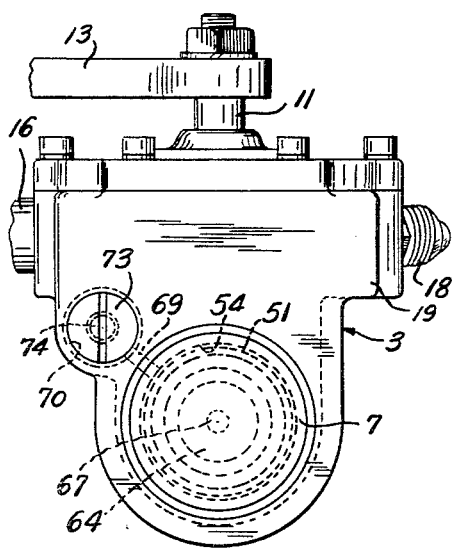
Fig. 3 is a bottom plan view of the device of Fig. 1.

The valve members 36 and 43 mounted in the fitting 18 and port 20 for controlling the entry of pressurized fluid into the cavity 5 or for controlling the exhaust of said pressure fluid, respectively, may be of any suitable construction, but are shown herein as of the usual type employed in the valve stem of a pneumatic tire, since they are readily available and easily mounted in position. With reference to Fig. 4 the sleeve fitting 18 is shown to be provided with a partially threaded bore 37, shaped on its inner end in the same manner as a bore in the usual pneumatic tire valve stem and into which a valve core or insides 38 of the valve 36 is threadably secured, as will be well understood in the art. The bore 37 in said fitting is so shaped that the valve core or insides screws into the same from the inner end of the fitting, whereby the end of the valve pin 39 extends into the pressure cavity 5 to a position to be normally engaged by the curved surface 32 of the cam 22.

Figure 5:
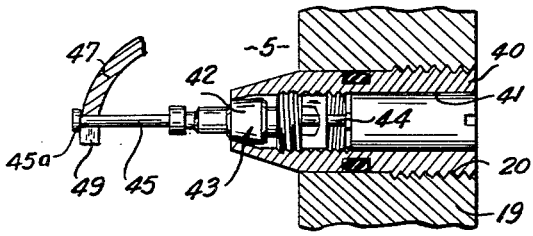
Fig. 5 is an enlarged fragmentary view in section of the device of Fig. 1 and shows a valve member carried in the housing in its normal closed position and which is actuated by the cam member to connect the housing pressure cavity and air spring to atmosphere.
Figure 6:
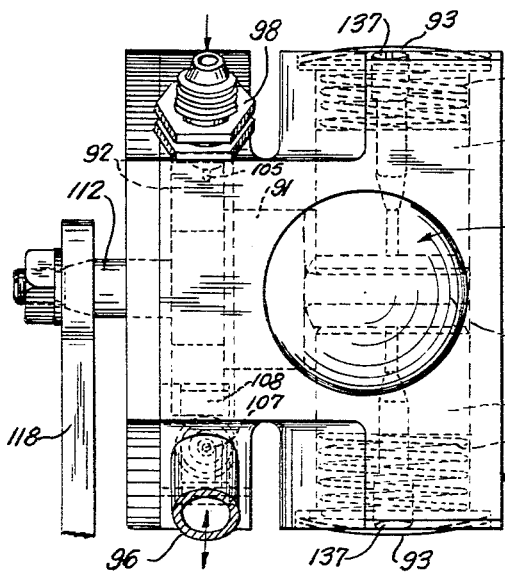
Fig. 6 is a top plan view of another form of device embodying the present invention.

An elongated sleeve 40, Fig. 5 is threadably secured in the port 20, and has a similarly disposed bore 41, extending centrally therethrough, but said bore is reversed as compared to the bore 37 in the aforesaid fitting 18. The valve core or insides 42 of the valve 43 is therefore necessarily reversed and is threadably secured in the bore 41 and its valve pin 44 is provided on its opposite end with an extended plunger 45. A lever 46, Figs. 1 and 5, having integrally formed and diametrically opposed and outwardly extending curved fingers 47 is pivotally mounted by means of dowel pin 48 to the wall or partition 4 and is disposed in the lower portion of the pressure cavity 5. One of said curved fingers is provided with a slot 49 on its end, into which the extended plunger 45 of the valve member 43 slidably interfits. Additionally, the extremity of said plunger is provided with an enlarged head 45a, which is larger than the width of said slot, whereby upon clockwise movement of said lever 46 the extended plunger 45 of valve member 43 is pulled into said cavity and is effective to actuate the latter valve member to connect the cavity and air spring to atmosphere. The oppositely disposed curved finger 47 of the lever 46 is adapted to be normally engaged by the curved surface 34 of the cam 22 adjacent the apex 35 whereby said lever is pivoted clockwise in response to the movement of the cam in a counterclockwise direction, as viewed in Fig. 1.

With the above construction in mind, it is therefore seen that upon a relative movement between the vehicle members such that said members are moved toward each other, the coupling between the shaft 11 and the barrel member 21 is effective to rotate the latter clockwise, as viewed in Fig. 1, whereby the cam 22 is rotated therewith to carry the semicircular surface 31 over the valve pin 39 of the valve member 36, depressing the same to actuate said valve member, whereby the cavity 5 and the air spring are connected to the source of pressurized air to inflate the latter. Conversely, an oppositely directed rotation of the cam caused by a relative movement between the vehicle members in the opposite direction will exert a clockwise pivotal movement upon the lever 46 effective to cause the actuation of the valve member 43 in the lower portion of the housing, which is, in turn, effective to connect the pressure cavity and associated air spring to atmosphere whereby the latter is deflated.

However, it is intended that the damped valve device is to be operative to effect the inflation or deflation of the air spring only in response to a prolonged and sustained relative movement between the vehicle members, and additionally is to be nonoperative to cause adjustment of said air spring in response to the more rapid movements between said vehicle members, such as are caused by operating the vehicle over an irregular roadway.

For this purpose a fluid damping and delay mechanism is incorporated into the device of the present invention, which is operative to delay the rotation of the barrel member. Said mechanism includes a substantially rectangular, flat paddle 50 formed integrally on the inner end of the barrel member 21 resiliently coupled to the shaft 11, and which extends diametrically thereacross and depends longitudinally outwardly from said end. Said inner end of the barrel member is of slightly reduced diameter to provide an annular opening 51 between the latter and the walls of the housing and the top of the partition wall 4 and opening into the upper portion of the cylinder 6, the purpose of which will be later explained. The paddle extends into and across the upper portion of the fluid cylinder 6 wherein the sides thereof are spaced inwardly of the wall of said cylinder to permit the transgression of fluid medium therebetween. A piston assembly 52, including a cylindrical piston 53 slidably disposed in the fluid cylinder 6 below the paddle 50 and defining a pressure chamber 54 between its lower valve carrying end and the closure member 7, is biased into pressure engagement with the underside of the paddle 50 by means of a spring 55 placed in the pressure chamber 54 and interposed between said latter end of the piston and said closure member. The upper portion of said fluid cylinder 6 above the cylindrical piston 52 is utilized as a fluid reservoir 56, the purpose for which will be presently explained.

A bore 57 formed centrally in said piston has its one end opening to the reservoir 56 and communicating on its opposite end with a counterbore 58. An annular recess 59 is provided on the lower end of the counterbore 58 into which is seated a valve plate 60. The end of the piston adjacent the annular recess 59 may be spun or otherwise similarly deformed to provide an annular rim 61 extending radially inwardly over the face of the valve plate 60 to retain the latter in its operative position. The valve plate 60 is also provided centrally with a port 62 which communicates with the counterbore 58 and pressure chamber 54. An annular valve seat 63 surrounds the end of the port 62 communicating with said pressure chamber and is adapted to seat the head 64 of a replenishing valve 65. A spring 66 surrounding the stem 67 of said valve and which has its opposite ends in pressure engagement with the valve plate 60 and a spring retaining washer 68 mounted on the end of said stem is effective to normally seat said valve upon its valve seat 63.

The pressure chamber 54 is connected in fluid circuit with the reservoir 56 by means including a port 69 which has one end communicating with the pressure chamber 54 and its opposite end connected to the central portion of a valve bore 70 formed in the housing and which extends upwardly therein in substantially parallel spaced relationship relative to the cylinder 6. One end of said bore opens to the exterior of the base 71 of the housing and is provided with internal threads 72, which are adapted to threadably secure a metering valve 73 therein. Said metering valve includes an elongated valve pin 74 which extends through the bore 70 in radially inwardly spaced relationship defining an annular opening 75 therebetween to permit the transgression of fluid medium therethrough. Said valve pin is additionally provided with a radially converging head 76 which conforms to the configuration of the opposite end of said bore and which is effective to be moved into and out of said opposite end to regulate the flow of fluid medium passing therethrough. A port 77 formed in the side wall of the housing has its one end connected to the latter end of said valve bore and its opposite end communicates with the annular opening 51 of reservoir 56. A quantity of suitable fluid medium, preferably oil, is placed in the fluid cylinder 6 such that the pressure chamber 54 is substantially filled and the reservoir 56 is supplied with a quantity sufficient to replenish said pressure chamber and maintain the latter substantially full of said medium throughout the stroke of the cylindrical piston 53.

With the above construction, and assuming that the vehicle is traveling over an irregular roadway, the impacts resulting therefrom are normally very short in duration and cause the aforesaid coupling interconnected between the shaft 11 and barrel member 21 to tend to oscillate the latter and swing the attached paddle 50. However, the fluid medium in the pressure chamber 54 of the fluid cylinder 6, exerting an upwardly directed force upon the piston 53, is effective to delay the movement of said shaft and the torsional coupling is thereby increased in proportion to the direction and magnitude of the oscillation of said shaft. And, since the impacts are normally of relatively short duration, the turning moments resulting therefrom are not sustained over a period of time sufficient to overcome the resistance of said fluid medium and the vehicle members are thereby retained in their normal "safe riding" spaced relationship.

However, when a force or impact is applied to the vehicle to cause its body and axles to move toward each other over a sustained period of time, such as occurs when the load carried by the body is increased, the turning moment resulting therefrom and applied to the shaft 11 and thence through the aforesaid torsional coupling to the barrel member 21, is prolonged over a period of time sufficient to overcome the resistance of the fluid medium in the pressure chamber 54. The shaft is then rotated to swing the paddle 50 clockwise as viewed in Fig. 1 whereby the piston 53 is forced downwardly into the pressure chamber 54. The fluid medium is thereby forced out of said chamber through the interconnected port 69, valve bore 70 and port 77, and thence to the reservoir 56. As mentioned previously, the rate of flow of said fluid medium in passing from the pressure chamber 54 to the reservoir 56 is regulated by the selective disposition of the metering valve 73 located in the valve bore 70. And, after the expiration of a predetermined period, a sufficient quantity of fluid medium is removed from the pressure chamber to allow the shaft 11 to be rotated through an arc sufficient to rotate the cam 22 clockwise and carry the semicircular surface 31 over the plunger 39 of the valve member 36 to effect the actuation of the latter. The air spring is thereby connected to the source of pressure fluid through the pressure cavity 5 and conduit 16 and is inflated in proportion to the relative movement between the vehicle members. As said air spring is inflated, the vehicle members are returned to their normal "safe riding" spaced relationship, which relative movement produces a turning moment upon the shaft in the opposite direction which operates to rotate said shaft counterclockwise as viewed in Fig. 1. The barrel member 21 and attached paddle 50 are thereby swung in a counterclockwise direction and the piston 53 follows the latter and is raised upwardly within the cylinder 6 by the spring 55. And, as said piston moves upwardly within the cylinder, the volume of the pressure chamber 54 is increased whereby the force exerted by the fluid medium in said chamber is decreased, causing a differential in force between the fluid medium in the reservoir and said chamber which is effective to actuate the replenishing valve 65 and allow a portion of the fluid medium in the reservoir to flow through the piston 53 and thereby maintain the pressure chamber substantially full of fluid medium. When the vehicle members are returned to their aforesaid normal spaced relationship, the activated components of the damped valve device are once again positioned in their relative nonoperative relationship as viewed in Figs. 1 and 2, whereby they are adapted to be actuated by a subsequent force or impact applied to the vehicle members.

And, it is now realized that when the vehicle members move relatively away from each other over a prolonged period of time, such as occurs when the load carried by the body is reduced, the shaft will be rotated in the opposite direction, or counterclockwise as viewed in Fig. 1 which is effective to increase the aforesaid torsional coupling in the opposite direction to that previously described. And, after a predetermined delay period, the resistance exerted by the damping and delay mechanism is overcome sufficiently to allow the barrel member 21 to be moved to a position to carry the semicircular surface 31 of the cam 22 over the upper arm 47 of the lever 46. Said latter movement provides a clockwise pivotal movement to said lever as viewed in Fig. 1, which is effective to force the extended plunger end 45 of the valve member 43 into the cavity 5 to cause the actuation of said valve member and connect the air spring to atmosphere through the cavity 5 and port 20. Said air spring is thereby deflated in proportion to the relative movement between the vehicle members whereby the latter are returned to their normal "safe riding" spaced relationship. And, upon said vehicle members being returned to their normal relationship, the resultant relative movement therebetween is effective to return the damped valve device to its nonoperative condition as described hereinabove to await a subsequent force or impact.

In Figs. 6–9 inclusive is shown an alternate embodiment of damped valve device embodying the concepts of the present invention, but utilizing a different form of damping and delay mechanism and disposition of the cam on the shaft and valve members which results in a more compact device.

Figure 7:
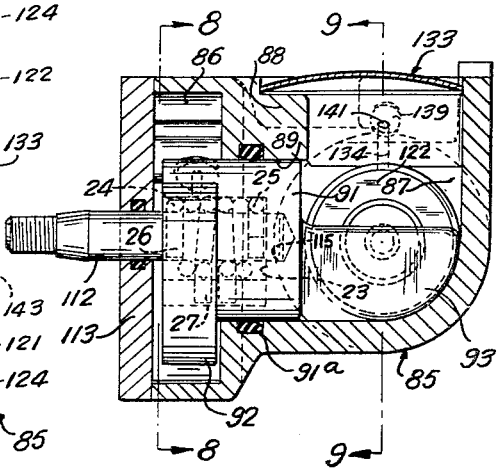
Fig. 7 is a longitudinal elevational view, shown partly in section, taken substantially on line 7—7 of Fig. 9 of the alternate form of damped valve device embodying the present invention.

More specifically, the present form of device includes a housing 85, substantially box-like in configuration, and provided therein with a pressure cavity 86 and a longitudinally extending fluid cylinder 87 separated one from the other by a vertical wall 88. A closure member 90 seals off each end of said cylinder from atmosphere. An opening 89 is also provided in the lower portion of said wall, communicating with said cavity and cylinder and into which is journalled a cylindrical barrel member 91. A suitable O-ring 91a mounted in said wall engages the periphery of said barrel member and is effective to prevent the transgression of pressure fluid therebetween. A cam 92 mounted on the periphery of said barrel member adjacent its one end, extends transversely outwardly thereof and into the pressure cavity 86. A substantially flat paddle 93 is integrally attached to the opposite end of said barrel member, extending radially thereacross and longitudinally outwardly thereof in perpendicular relationship to said latter end. Said paddle extends into and through the center of the fluid cylinder 87, and, as is shown in Fig. 7, is normally vertically disposed in said cylinder in its nonoperative position. The housing 85 is provided with an internally threaded port 95 communicating with the pressure cavity 86 and which is adapted to receive one end of a suitable conduit 96, the other end of which is connected to the air spring (not shown of the fluid suspension system. Said housing is also provided with a threaded port 97 adapted to receive a suitable fitting 98, which, in turn, connects with a source of pressure fluid, and, as in the previous form, is preferably pressurized air. An internally threaded port 99 is formed in the lower portion of the housing 85, extending vertically upwardly therethrough and which communicates with the pressure cavity 86 on the side opposite to the port 97. The fitting 98 mounts a valve member 101, and, in like manner, the port 99 is adapted to receive a valve member 102, both of which are similar in construction to the valve members 36 and 43, respectively, of the previous form, and, therefore, a further detailed description will not be given. However, the valve members of the present form are also actuated by the movement of the cam 92, as will be hereinafter more fully explained, in a manner similar to that of the valve members 36 and 43 by their associated cam 22, to connect the air spring to the source of pressurized air or to atmosphere, and cause adjustment to said air spring, depending upon the direction of relative movement between the vehicle members.

With the above described disposition of the valve members 101 and 102, it is now seen that the cam 92 may be mounted on the barrel 91 and normally positioned in the pressure cavity 86 such that its semicircular surface 103 is adjacent the bottom similarly curved wall 104 of said cavity. Therefore, with reference to the nonoperative position of the cam 22 in the previous form as shown in Fig. 1, the cam 92 in the present instance is displaced approximately 90° in a counterclockwise fashion whereby the overall height of the housing is substantially reduced. And, further, the plunger 105 of the valve member 101 extends into the pressure cavity 86 such that it normally engages the inwardly curved surface 106 of the cam 92. And, in like manner, the extended end 107 of the plunger of valve member 102 is operatively connected to a lever 108, which in turn, is pivotally connected at its one end 109 to the housing, whereas its opposite end normally engages the opposed inwardly curved surface 110 of said cam.

The device of the present form also includes an oscillatable shaft 112 suitably journalled in the end cap 113 of the housing and which is adapted to extend into a blind bore 115 formed centrally in the barrel member 91 and is resiliently interconnected thereto by means of the torsional coupling described in the previous embodiment.

The opposite end of the shaft extends outwardly of the end cap 113 of the housing and is adapted to receive a rock lever 118, which in turn, may be attached to the riding axles of the vehicle.

Figures 8, 9:
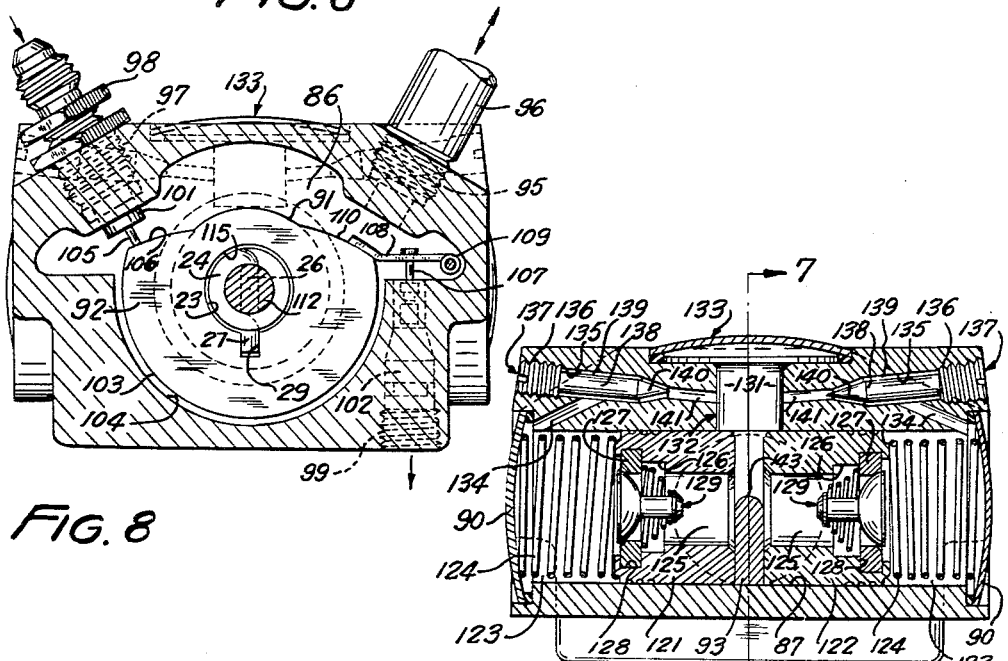
Fig. 8 is an end view taken substantially on line 8—8 of Fig. 7 but with the housing cap removed to show internal structure.
Fig. 9 is a longitudinal sectional view taken substantially on line 9—9 of Fig. 7 and shows the alternate form of damping and delaying mechanism embodying the present invention.

With this construction it is now realized that when the shaft 112 is rotated clockwise as viewed in Fig. 8, in response to a sustained relative movement between the vehicle members that moves said members toward each other, the semicircular surface 103 of the cam 92 is carried over the plunger 105 of the valve member 101 and is effective to actuate the latter and connect the air spring to the source of pressurized air. And, in like manner, when the shaft is rotated counterclockwise, in response to a relative movement between the vehicle members that moves said members away from each other, the semicircular surface 103 of the cam 92 is carried over the free end of the lever 108 and is effective to pivot said lever clockwise whereby the plunger end 107 of the valve member 102 is raised into the cavity to actuate said valve member and connect the air spring to atmosphere.

The instant form of damped valve devices also includes a damping and delay mechanism which is effective to delay the oscillation of the barrel member 91 whereby the valve members are actuated only in response to a sustained force or impact causing relative movement between the vehicle members.

Said mechanism includes a pair of separate cylindrical pistons 121 and 122, each similar in configuration, and slidably disposed in opposed relationship in the cylinder 87 on either side of the paddle member 93. As is shown in Fig. 9, each of said pistons extends longitudinally partially through the cylinder and defines a pressure chamber 123 between its end opposite to said paddle member and the closure member 90 in the adjacent end of the cylinder. A spring 124 disposed in each pressure chamber 123 is effective to bias the piston associated therewith into pressure engagement with the adjacent side of the paddle member 93. Each of said pistons is provided centrally with a bore 125 which communicates on its inner end with the central portion of the cylinder 87 and on its opposite end with a counterbore 126. A valve plate 127 carried in an annular recess 128 provided on the outer end of each piston and juxtaposed to said counterbore, centrally mounts a replenishing valve 129, similar in structure and function to the corresponding valve in the previous form. Each of said replenishing valves is selectively operative, in a manner to be later explained, to connect the central portion of the cylinder 87 to the pressure chamber 123 associated therewith whereby the latter is maintained substantially full of fluid medium.

A cavity 131, substantially rectangular in configuration, is formed in the upper portion of the housing above the cylinder 87 and its lower end communicates with the central portion of the latter, which, in conjunction with said cavity defines a fluid containing reservoir 132. A closure member 133 seals the top of said cavity from atmosphere. Each of the pressure chambers 123 is connected in fluid circuit with the cavity 131 by means including a port 134 communicating on its one end with the pressure chamber 123 and on its opposite end with a valve bore 135. One end of each of said bores opens to the exterior of the housing and is provided with internal threads 136 adapted to secure a metering valve 137 therein. Said metering valve includes an elongated pin 138 which extends through the valve bore 135 in radially inwardly spaced relationship defining an annular opening 139 therebetween and provided on its end with a radially converging head 140 which conforms to the configuration of the opposite end of said valve bore. Said pin is adapted to be manually selectively positioned within said opposite end of the valve bore and is thereby effective to regulate the flow of fluid medium flowing therethrough. A pair of ports 141 formed in the upper portion of the housing 85 on opposite sides of the cavity 131 have one end connected to said latter end of each of the valve bores 135 whereas, the opposite ends thereof communicate with the cavity 131. A quantity of fluid medium, preferably oil, is placed in each pressure chamber 123 such that the same are substantially filled, and in like manner, a quantity of such fluid is also placed in the reservoir 132 sufficient to replenish said pressure chambers and to maintain the latter substantially full of said fluid throughout the stroke of the pistons.

With the above described structure, and assuming that the vehicle is traveling over an irregular roadway, the impacts resulting therefrom are normally very short in duration and therefore are not sustained over a period sufficient to overcome the fluid resistance exerted by the damping and delay mechanism. Consequently, the valve members 101 and 102 are not actuated and the vehicle members are retained in their normal "safe riding" spaced relationship.

However, when a force or impact is applied to the vehicle to cause its body and riding axles to move toward each other over a sustained period, such as occurs when the load carried by the body is increased, the turning moment resulting therefrom and applied to the shaft 112 through the rock lever 118 increases the coupling between said shaft and barrel member 91 sufficiently to overcome the resistance exerted by the fluid medium in the right-hand pressure chamber 123, as viewed in Figure 9. The shaft 112 is then able to rotate and swing the barrel member to carry the paddle 93 counterclockwise whereby the piston 122 is forced outwardly longitudinally of the cylinder 87 and toward its adjacent end. In this manner, the fluid medium is forced out of said latter pressure chamber and into the reservoir 132 through the associated interconnected port 134, valve bore 135 and port 140. And, as previously mentioned, the rate of flow of said fluid medium in returning to the reservoir is determined by the selective disposition of the metering valve 137 in said latter valve bore 135. After a predetermined period, a sufficient quantity of fluid is removed from said pressure chamber to allow the shaft 112 to rotate the cam 92 and carry its semicircular surface 103 over the plunger 105 of the valve member 101 and effect the actuation of the latter. The air spring is thereby connected to the source of pressurized air through the pressure cavity 86 and conduit 96 and is inflated in proportion to the relative movement between the vehicle members. During the counterclockwise swinging movement of the paddle member 93, the nonactuated piston in the left-hand side of the cylinder 87, as viewed in Fig. 9, remains stationary since it engages the radial end 143 of said paddle member.

With the inflation of the air spring, the vehicle members are returned to their normal "safe riding" spaced relationship, which relative movement produces a turning moment upon the shaft in the opposite direction. And, since said nonactuated piston in the left-hand side of the cylinder 87 has not moved, the barrel member 91 is free to be swung in said opposite direction and therefore readily follow said latter movement of the shaft. Also, the actuated piston in the right-hand side of the cylinder 87 readily follows the movement of the actuated paddle member 93 under the influence of its recoil spring 124 to rapidly return said piston to its central inoperative position within said cylinder. As said actuated piston moves under the influence of its recoil spring, the force exerted by the fluid medium in the pressure chamber 123 associated with said latter piston is decreased, creating a differential in force between the fluid medium contained therein and in the reservoir 132, which is effective to actuate the replenishing valve 129 of said latter piston and allow fluid medium to flow from said reservoir and into said pressure chamber to replenish the same. Said return movement of the shaft and barrel member is continued until the vehicle members are returned to their aforesaid normal spaced relationship, at which time, said paddle member and actuated piston are again re-set centrally within the cylinder 87 in their nonoperative position, as shown in Fig. 9, to ready the damped valve device for a subsequent operative cycle.

It is now realized, that when the vehicle members move relatively away from each other, such as is caused by decreasing the load carried by the body, the shaft 112 and barrel member 91 are rotated in the opposite direction to that described above after overcoming the fluid resistance exerted by the damping and delay mechanism. Said rotation moves the semicircular surface 103 of the attached cam 92 into engagement with the lever 108 whereby the latter is pivoted to carry the plunger 107 of the valve member 102 attached thereto into the pressure cavity 86. Said valve member is thereby actuated to connect the air spring to atmosphere through the pressure cavity 86 and port 99 to effect its deflation in proportion to the relative movement between the vehicle members whereby the latter are returned to their normal spaced relationship. And, as the air spring is deflated, the relative movement between the vehicle members resulting therefrom is effective to rapidly return the paddle member 93 and associated actuated piston to their nonoperative central position, in a manner as above described, and to condition the damaged valve device for a subsequent operative cycle.

It is therefore realized that in each of the above described operational cycles of the instant form, the relative movement between the vehicle members resulting from an adjustment to the air spring is effective to cause the barrel member 91 coupled to the shaft 17 to readily follow the return movement of the latter, and is not delayed by the aforesaid damping and delay mechanism.

Additionally, it is realized that, as the vehicle members are being repositioned to their normal "safe riding" relationship they effect a rapid return of the shaft and barrel member to their non-operative position whereby the actuated valve is quickly permitted to close disconnecting the air spring from the source of pressure fluid or atmosphere, depending upon the direction of the relative movement between the vehicle members, and thus prevent an overadjustment to the air spring.

Having thus described several preferred embodiments, it is realized that the present invention is susceptible of various modifications and combinations that are within the spirit and scope of the appended claims.

I claim:

1. In a damped valve device for controlling a pressure fluid unit that effects the relative movement between two movable members, a housing to be attached to one of said movable members and having a pressure cavity and a separate fluid containing cylinder, a shaft oscillatably journalled in said housing, a cylindrical barrel surrounding the shaft within the cavity in radially spaced relation with the shaft, variable coupling means in said space surrounding said shaft operatively connecting said shaft to said barrel, said shaft being adapted to be operatively connected to the other of said movable members for rotation in one direction in reponse to relative movement between the movable members in one direction, and for rotation in the opposite direction in response to an oppositely directed relative movement between the movable members, cam means mounted by said barrel within said cavity in a plane substantially transverse to the longitudinal axis of the shaft, means for connecting said pressure fluid unit to said pressure cavity, first valve means for connecting said pressure cavity to a source of pressure fluid, second valve means for connecting said pressure cavity to atmosphere, separate operating means for said first and second valve means extending into said pressure cavity and engaging said cam means, said cylindrical barrel being movable with the shaft in one direction in response to a relative movement between said movable members in one direction to carry the cam means therewith and actuate the operating means for said first valve means and connect said pressure cavity to said source of pressure fluid, and movable with said shaft in the opposite direction in response to an oppositely directed relative movement between said movable members to actuate the operating means for said second valve means and connect said pressure cavity to atmosphere, a paddle member carried by said barrel independent of said cam means positioned within said cylinder in a plane substantially parallel to the longitudinal axis of the shaft, and piston means in said cylinder engaging said paddle member and effective to retard the movement of said cylindrical barrel and delay the actuation of said valve means.

2. In a damped valve device for controlling a pressure fluid unit that effects the relative movement between two movable members, a housing to be attached to one of said movable members and having a pressure cavity and a separate fluid containing cylinder, a shaft oscillatably journalled in said housing, a cylindrical barrel surrounding the shaft within the cavity in radially spaced relation with the shaft, variable coupling means in said space surrounding said shaft operatively connecting said shaft to said barrel, said shaft being adapted to be operatively connected to the other of said movable members for rotation in one direction in response to relative movement between the movable members in one direction, and for rotation in the opposite direction in response to an oppositely directed relative movement between the movable members, cam means mounted by said barrel within said cavity in a plane substantially transverse to the longitudinal axis of the shaft, means for connecting said pressure fluid unit to said pressure cavity, first valve means for connecting said pressure cavity to a source of pressure fluid, second valve means for connecting said pressure cavity to atmosphere, separate operating means for said first and second valve means extending into said pressure cavity and engaging said cam means, said cylindrical barrel being movable with the shaft in one direction in response to a relative movement between said movable members in one direction to carry the cam means therewith and actuate the operating means for said first valve means and connect said pressure cavity to said source of pressure fluid, and movable with said shaft in the opposite direction in response to an oppositely directed relative movement between said movable members to actuate the operating means for said second valve means and connect said pressure cavity to atmosphere, a paddle member carried by said barrel independent of said cam means positioned within said cylinder in a plane substantially parallel to the longitudinal axis of the shaft, and piston means in said cylinder engaging said paddle member and effective to retard the movement of said cylindrical barrel and delay the actuation of said valve means, said cam means including a substantially semicircular cam surface generated about the shaft axis terminating in a pair of curved surfaces extending inwardly toward said barrel, said separate operating means for the first and second valve means normally engaging said curved surfaces and alternately actuated by said semicircular cam surface in response to a relative movement between the movable members in opposite directions.

3. In a damped valve device for controlling a pressure fluid unit that effects the relative movement between two movable members, a housing to be attached to one of said movable members and having a pressure cavity and a separate fluid containing cylinder, a shaft journalled in said housing to be operatively connected to the other of said movable members for rotation in one direction in response to relative movement between the movable members in one direction, and for rotation in the opposite direction in response to an oppositely directed relative movement between the movable members, a cylindrical barrel mounted on said shaft in surrounding radially spaced relation therewith within said cavity, a pair of coil springs in said space surrounding said shaft each with ends secured respectively to the shaft and barrel, a cam carried by said barrel extending perpendicularly therefrom and into said pressure cavity, a semicircular surface on said cam bounded by opposed curved surfaces extending inwardly toward said barrel, means for connecting said pressure fluid unit to said pressure cavity, first valve means for connecting said pressure cavity to a source of pressure fluid, second valve means for connecting said pressure cavity to atmosphere, operating means for said first valve means extending into said pressure cavity and normally engaging one of said opposed curved surfaces on said cam, operating means for said second valve means extending into said pressure cavity, actuating means normally connecting said latter operating means to another of said opposed curved surfaces on said cam, said shaft being rotatable in one direction in response to a relative movement between said movable members in one direction to rotate said barrel and carry said semicircular surface of said cam into actuating engagement with the operating means for said first valve means, and rotatable in the opposite direction in response to an oppositely directed relative movement between the movable members to rotate said cam and carry said semicircular surface into engagement with said actuating means to effect the actuation of said operating means for said second valve means, a paddle member attached to said cylindrical barrel in longitudinal extension therewith and disposed in said fluid containing cylinder, and piston means in said fluid containing cylinder engaging said paddle member and effective to retard the movement of said cylindrical barrel and delay the actuation of said valve means.

4. In a damped valve device for controlling a pressure fluid unit that effects the relative movement between two movable members, a housing to be attached to one of said movable members and having a pressure cavity and a separate fluid containing cylinder, a shaft journalled in said housing to be operatively connected to the other of said movable members for rotation in one direction in response to relative movement between the movable members in one direction, and for rotation in the opposite direction in response to an oppositely directed relative movement between two movable members a cylindrical barrel mounted on said shaft in surrounding radially spaced relation therewith within said cavity, a pair of coil springs in said space surrounding said shaft each with ends secured respectively to the shaft and barrel, a cam carried by said barrel extending perpendicularly therefrom and into said pressure cavity, a semicircular surface on said cam bounded by opposed curved surfaces extending inwardly toward said barrel, means for connecting said pressure fluid unit to said pressure cavity, first valve means for connecting said pressure cavity to a source of pressure fluid, second valve means for connecting said pressure cavity to atmosphere, operating means for said first valve means extending into said pressure cavity and normally engaging one of said opposed curved surfaces on said cam, operating means for said second valve means extending into said pressure cavity, actuating means normally connecting said latter operating means to another of said opposed curved surfaces on said cam, said shaft being rotatable in one direction in response to a relative movement between said movable members in one direction to rotate said barrel and carry said semicircular surface of said cam into actuating engagement with the operating means for said first valve means, and rotatable in the opposite direction in response to an oppositely directed relative movement between the movable members to rotate said cam and carry said semicircular surface into engagement with said actuating means to effect the actuation of said operating means for said second valve means, a paddle member attached to said cylindrical barrel in longitudinal extension therewith and disposed in said fluid containing cylinder, and piston means in said fluid containing cylinder engaging said paddle member and effective to retard the movement of said cylindrical barrel and delay the actuation of said valve means, said actuating means comprising a lever pivotally mounted in said pressure cavity and connected on its one end to the operating means for the second valve means and its opposite end normally in engagement with another of said opposed curved surfaces on said cam.

5. In a damped valve device for controlling a pressure fluid unit that effects the relative movement between two movable members, a housing to be attached to one of said movable members and having a pressure cavity and a separate fluid containing cylinder, a shaft journalled in said housing to be operatively connected to the other of said movable members for rotation in one direction in response to relative movement between the movable members in one direction, and for rotation in the opposite direction in response to an oppositely directed relative movement between the movable members, a cylindrical barrel mounted on said shaft in surrounding radially spaced relation therewith within said cavity, a pair of coil springs in said space surrounding said shaft each with ends secured respectively to the shaft and barrel, a cam carried by said barrel extending perpendicularly therefrom and into said pressure cavity, a semicircular surface on said cam bounded by opposed curved surfaces extending inwardly toward said barrel, means for connecting said pressure fluid unit to said pressure cavity, first valve means for connecting said pressure cavity to a source of pressure fluid, second valve means for connecting said pressure cavity to atmosphere, operating means for said first valve means extending into said pressure cavity and normally engaging one of said opposed curved surfaces on said cam, operating means for said second valve means extending into said pressure cavity, actuating means normally connecting said latter operating means to another of said opposed curved surfaces on said cam, said shaft being rotatable in one direction in response to a relative movement between said movable members in one direction to rotate said cylindrical barrel and carry said semicircular surface of said cam into actuating engagement with the operating means for said first valve means, and rotatable in the opposite direction in response to an oppositely directed relative movement between the movable members to rotate said cam and carry said semicircular surface into engagement with said actuating means to effect the actuation of said operating means for said second valve means, a paddle member attached to said cylindrical barrel extending diametrically thereacross and in longitudinal extension therewith and disposed in said fluid containing cylinder, piston means in said cylinder and dividing the latter into a pressure chamber and a fluid reservoir, means providing communication between said pressure chamber and fluid reservoir and to permit pressure fluid to flow therebetween, and valve means in said latter means adapted to regulate the flow of said pressure fluid, said piston means being effective to retard the movement of said cylindrical barrel and delay the actuation of said valve means.

6. In a damped valve device for controlling a pressure fluid unit that effects the relative movement between two movable members, a housing to be attached to one of said movable members and having a pressure cavity and a separate fluid containing cylinder, a shaft journalled in said housing to be operatively connected to the other of said movable members for rotation in one direction in response to relative movement between the movable members in one direction, and for rotation in the opposite direction in response to an oppositely directed relative movement between the movable members, a cylindrical barrel mounted on said shaft in surrounding radially spaced relation therewith within said cavity, a pair of coil springs in said space surrounding said shaft each with ends secured respectively to the shaft and barrel, a cam carried by said barrel extending perpendicularly therefrom and into said pressure cavity, a semicircular surface on said cam bounded by opposed curved surfaces extending inwardly toward said barrel, means for connecting said pressure fluid unit to said pressure cavity, first valve means for connecting said pressure cavity to a source of pressure fluid, second valve means for connecting said pressure cavity to atmosphere, operating means for said first valve means extending into said pressure cavity and normally engaging one of said opposed curved surfaces on said cam, operating means for said second valve means extending into said pressure cavity, actuating means normally connecting said latter operating means to another of said opposed curved surfaces on said cam, said shaft being rotatable in one direction in response to a relative movement between said movable members in one direction to rotate said barrel and carry said semicircular surface of said cam into actuating engagement with the operating means for said first valve means, and rotatable in the opposite direction in response to an oppositely directed relative movement between the movable members to rotate said cam and carry said semicircular surface into engagement with said actuating means to effect the actuation of said operating means for said second valve means, a paddle member attached to said cylindrical barrel in longitudinal extension therewith and disposed in said fluid containing cylinder, and piston means in said fluid containing cylinder engaging said paddle member and effective to retard the movement of said cylindrical barrel and delay the actuation of said valve means, said piston means comprising a pair of pistons in the fluid containing cylinder engaging opposed sides of said paddle member and effective to retard the movement of said cylindrical barrel and delay the actuation of the valve means, and said paddle member being movable in response to a sustained relative movement between said movable members in either direction to effect a movement of one of said pistons and overcome the retarding effect to the movement of said cylindrical barrel.

References Cited in the file of this patent
UNITED STATES PATENTS

| | | |
|---|---|---|
| 832,834 | Bell | Oct. 9, 1906 |
| 2,668,560 | Svaty | Feb. 9, 1954 |
| 2,670,201 | Rossman | Feb. 9, 1954 |
| 2,787,475 | Jackson | Apr. 2, 1957 |